UNITED STATES PATENT OFFICE

ALBERT FRANK, OF CHARLOTTENBURG, AND HERMANN FREUDENBERG, OF FRANKFORT-ON-THE-MAIN, GERMANY, ASSIGNORS, BY MESNE ASSIGNMENTS, TO THE FIRM OF SOCIETA GENERALE PER LA CIANAMIDE, OF ROME, ITALY.

FERTILIZER.

13,131. Specification of Reissued Letters Patent. Reissued July 12, 1910.

No Drawing. Original No. 724,565, dated April 7, 1903, Serial No. 83,762. Application for reissue filed June 25, 1907. Serial No. 380,835.

*To all whom it may concern:*

Be it known that we, ALBERT FRANK, chemist, of Charlottenburg, and HERMANN FREUDENBERG, chemist, of Frankfort-on-the-Main, Germany, have invented certain new and useful Improvements in Fertilizers; and we do hereby declare the following to be a full, clear, and exact description of the invention, such as will enable others skilled in the art to which it appertains to make and use the same.

By a process known from British Patents Nos. 15,066, of August 10, 1895, and 25,475, of December 2, 1898, nitrogenous compounds are produced by the action at high temperatures of nitrogen (in any suitable form) on the carbid of alkali and alkaline earths in any suitable form—that is to say, in the form of finished carbid or mixtures suitable for forming them—such, for instance, as a mixture of lime and coal. The nitrogenous compounds obtained have, as shown by experiments made by us, a manurial value which may be regarded as equivalent to that of ammonia. We have also discovered that the manurial action depends, essentially, on the presence of cyanamid, and by the word "cyanamid" is understood both cyanamid itself and also its derivatives, such as its metallic compounds—for instance, cyanamid of calcium—also polymerization products, such as dicyandiamid, and also conversion products, such as urea. Accordingly the cyanamid is to serve for nourishing plants—that is to say, as a nitrogenous manure in agriculture—it being immaterial for the present invention whether the cyanamid described be pure or impure—that is to say, in the form of the crude product produced or mixed with other substances—such, for instances, as direct or indirect manurial substances.

Hitherto in addition to animal and vegetable manures—such, for instance, as stable-manure and superphosphates—agriculture had at disposal practically only nitrate of soda and ammonia salts as nitrogenous artificial manures; but the use of this is limited by their restricted production and by their price.

By the present invention the advantage is afforded of remuneratively utilizing the nitrogen of the air for manurial purposes, as cyanamid and substances containing cyanamid can be obtained in any desired quantity from the nitrogen of the air, as hereinbefore explained.

The use of cyanamid has the advantage that it may be mixed with the ordinary potash and phosphate manures, and thereby a product very rich in nitrogen obtained. For instance, by using cyanamid or dicyandiamid containing about sixty-six per cent. of nitrogen mixed with superphosphate a mixed manure may be obtained containing such an amount of nitrogen and phosphoric acid as has been hitherto unobtainable when using the ordinary nitrogenous manures. If, for instance, a superphosphate containing twenty per cent. of soluble phosphoric acid is to be converted into a mixed manure which contains five per cent. of nitrogen, it is necessary, where sulfate of ammonia is employed, to mix twenty-five parts of sulfate of ammonia with seventy-five parts of superphosphate, and a product is obtained which contains, in addition to five per cent. nitrogen, only fifteen per cent. phosphoric acid. If, however, cyanamid, or, rather, its polymerization product (the dicyandiamid) be used, it is only necessary to take for ninety-two parts of superphosphate eight parts of cyanamid, and a product is obtained which contains, in addition to the required five per cent. of nitrogen, also 18.4 per cent. of phosphoric acid.

The use of the hereinbefore-described crude-formed substances practically containing from twenty to twenty-four per cent. of nitrogen has an advantage over the use of the known high per cent. nitrogenous manures—such, for instance, as sulfate of ammonia, containing about twenty per cent. nitrogen, and nitrate of soda, containing about sixteen per cent. of nitrogen—not only in possessing a higher percentage of nitrogen, but also that by the most customary use of lime as basis of the carbid or carbid-forming mixture serving for producing the cyanamid two valuable nutritive substances—namely nitrogen and lime—are at the same time given to the ground and the plants.

The action of substances containing cyanamid is a uniform one and is suitable for the growth of plants.

We claim—

1. A fertilizer containing as an essential constituent cyanamid, the latter, by decomposition in the soil yielding up its nitrogen, substantially as set forth.

2. A fertilizer containing as essential constituents lime and cyanamid, the latter, by decomposition in the soil yielding up its nitrogen, substantially as set forth.

3. The process of enriching the soil for nourishing plant life, which consists in subjecting cyanamid to decomposition in said soil.

4. The process of enriching the soil, which consists in subjecting calcium cyanamid to decomposition in the soil.

In testimony whereof we have signed our names to this specification in the presence of two subscribing witnesses.

ALBERT FRANK.
HERMANN FREUDENBERG.

Witnesses as to Albert Frank:
CHAS. H. BAKER,
FRIDR. C. MUNDT.

Witnesses as to Hermann Freudenberg:
FRIEDRICH WEIGAND,
LUDWIG SCHNELL.